(12) United States Patent
Nakayama (10) Patent No.: US 8,544,668 B2
(45) Date of Patent: Oct. 1, 2013

(54) BOTTLE WITH HANDLE (75) Inventor: Tadayori Nakayama, Tokyo (JP)

(73) Assignee: Yoshino Kogyosho Co., Ltd., Tokyo (JP)

( * ) Notice: Subject to any disclaimer, the term of this patent is extended or adjusted under 35 U.S.C. 154(b) by 0 days.

(21) Appl. No.: 13/469,757

(22) Filed: May 11, 2012

(65) Prior Publication Data
US 2012/0298616 A1  Nov. 29, 2012

(30) Foreign Application Priority Data

May 27, 2011 (JP) .................... 2011-119307

(51) Int. Cl.
B65D 23/10 (2006.01)
(52) U.S. Cl.
USPC ........... 215/396; 215/398; 215/384; 220/752; 220/755; 220/759; 220/770
(58) Field of Classification Search
USPC ................. 215/384, 396, 398; 220/752, 755, 220/759
See application file for complete search history.

(56) References Cited

U.S. PATENT DOCUMENTS

| 4,964,522 | A | * | 10/1990 | Umetsu et al. | 215/398 |
| 5,535,901 | A | * | 7/1996 | Ishii et al. | 215/396 |
| 7,481,326 | B2 | * | 1/2009 | Itokawa et al. | 215/398 |
| 2005/0115919 | A1 | * | 6/2005 | Itokawa et al. | 215/398 |
| 2010/0282708 | A1 | * | 11/2010 | Matsuo et al. | 215/396 |

FOREIGN PATENT DOCUMENTS

| JP | Y2-2571830 | 5/1998 |
| JP | Y2-2589709 | 2/1999 |
| JP | A-2000-16435 | 1/2000 |
| WO | WO 2004/011228 A1 | 2/2004 |

* cited by examiner

Primary Examiner — Mickey Yu
Assistant Examiner — Brijesh V. Patel
(74) Attorney, Agent, or Firm — Oliff & Berridge, PLC (57) ABSTRACT This bottle with a handle in which the body portion is formed with a concave portion, the bottle includes a support projection portion projected outward in the radial direction on a bottom surface of the concave portion, and protrusion portions which are provided at both side portions of the support projection portion with a gap between the bottom surface and the protrusion portions laterally projecting, the handle includes a pair of mounting beams, a handle plate, and an engagement projection piece, and the pair of mounting beams are integrally provided in a bridged beam configured to connect each of the mounting beams in a state of being separated inward from the handle plate in the radial direction.

2 Claims, 7 Drawing Sheets

BOTTLE WITH HANDLE

BACKGROUND OF THE INVENTION

1. Field of the Invention

The present invention relates to a bottle with a handle.

Priority is claimed on Japanese Patent Application No. 2011-119307, filed May 27, 2011, the contents of which is incorporated herein by reference.

2. Description of Related Art

From the related art, as a bottle with a handle in which a handle is attached to a body portion, for example, a configuration is known which includes a body portion, a bottle, and a handle as shown in PCT International Publication No. WO2004/011228. Specifically, the body portion of a bottle is formed with a concave portion which is recessed inward in a radial direction thereof. The bottle includes a support projection portion which is projected outward in the radial direction on a bottom surface of the concave portion, and protrusion portions which are provided with both side portions of the support projection portion with a gap between the bottom surface and which are projected outward. Moreover, the handle includes a pair of mounting beams which have contact surfaces coming into contact with each portion extended to both side portions of the support projection portion on the bottom surface of the concave portion, a handle plate which is disposed outside the mounting beams in the radial direction and in which both ends of a bottle axial direction are separately connected to both ends of the bottle axial direction of the pair of mounting beams, and an engagement projection piece which is provided with the pair of mounting beams and which is projected toward an opposite direction in which the mounting beams face each other, and is engaged with the gap.

However, in the bottle with the handle of the related art mentioned above, there was room for improvement in firmly attaching the handle to the bottle.

SUMMARY OF THE INVENTION

The present invention provides a bottle with a handle that the handle can be firmly attached to the bottle.

According to a first aspect of the present invention, a bottle with a handle including a body portion formed with a concave portion recessed inward in a radial direction of the bottle; a support projection portion projected outward in the radial direction on a bottom surface of the concave portion; protrusion portions being provided at both side portions of the support projection portion with a gap between the bottom surface, the protrusion portions laterally projecting; and a handle being attached to the body portion. The handle includes a pair of mounting beams having contact surfaces coming into contact with each portion extended to both side portions of the support projection portion on the bottom surface of the concave portion; a handle plate which is disposed outside the mounting beams in the radial direction and in which both ends of a bottle axial direction are separately connected to both ends of the bottle axial direction of the pair of mounting beams; and an engagement projection piece which is provided on the pair of mounting beams, the engagement projection projecting toward an opposite direction in which the mounting beams face to each other, and being engaged with the gap. The pair of mounting beams are integrally provided in a bridged beam configured to connect each of the mounting beams in a state of being separated inward from the handle plate in the radial direction.

According to the first aspect of the present invention, since the bridged beam is disposed, it is possible to suppress the pair of mounting beams being displaced in an expanding direction so as to be separated from each other. As a result, it is possible to prevent the handle from being shifted or deviated with respect to the bottle due to the deviation of the engagement projection piece from the gap.

Furthermore, since the bridged beam is separated inward from the handle plate in the radial direction, even when the bridged beam is provided, the gripping of the handle plate is possible to suppress the handle plate being difficult to grip.

In addition, the bridged beam is integrally provided in the mounting beams. For that reason, it is possible to prevent an increase in the number of components, and it is possible to reliably suppress the pair of mounting beams being displaced in an expanding direction so as to be separated from each other as mentioned above.

According to a second aspect of the present invention, in the bottle with handle of the first aspect of the present invention, the mounting beam includes a straight line portion which is extended in the bottle axial direction, and a connection portion which is extended in the radial direction and connects upper ends of the straight line portion and upper end of the handle plate and lower ends thereof. The engagement projection piece is disposed in the straight line portion, and the bridged beam is disposed in the end portion of the connection portion at the straight line portion side.

According to the second aspect of the present invention, the bridged beam is disposed in the connection portion rather than the straight line portion in the mounting beam. Therefore, it is possible to prevent the disposition position of the engagement projection piece from being limited due to the fact that the bridged beam is disposed. As a result, it is possible to prevent the attachment strength of the handle relative to the bottle being reduced, due to the fact that the bridged beam is disposed.

In addition, the bridged beam is disposed at the end portion of the straight line portion side rather than the portion near the handle plate in the connection portion. For this reason, it is possible to more reliably suppress the pair of mounting beams being displaced in an expanding direction so as to be separated from each other as mentioned above.

According to the bottle with the handle described above, the handle can be firmly attached to the bottle.

DETAILED DESCRIPTION OF THE INVENTION

Hereinafter, an embodiment of the bottle with the handle according to the present invention will be described with reference to the drawings.

As shown in FIGS. 1 to 4, a bottle with a handle 1 according to the present embodiment includes a bottle 11, and a handle 13 attached to a body portion 16 of the bottle 11.

In the bottle with the handle 1, the bottle 11 is formed by performing the blow molding a cylindrical preform having a bottom in a cavity into which the handle 13 is inserted. At the same time, the handle 13 is fixed to the bottle 11. In addition, an internal volume of the bottle 11 is, for example, greater than or equal to 1 liter. Furthermore, the preform and the handle 13 are formed by the injection molding.

Figure 1:
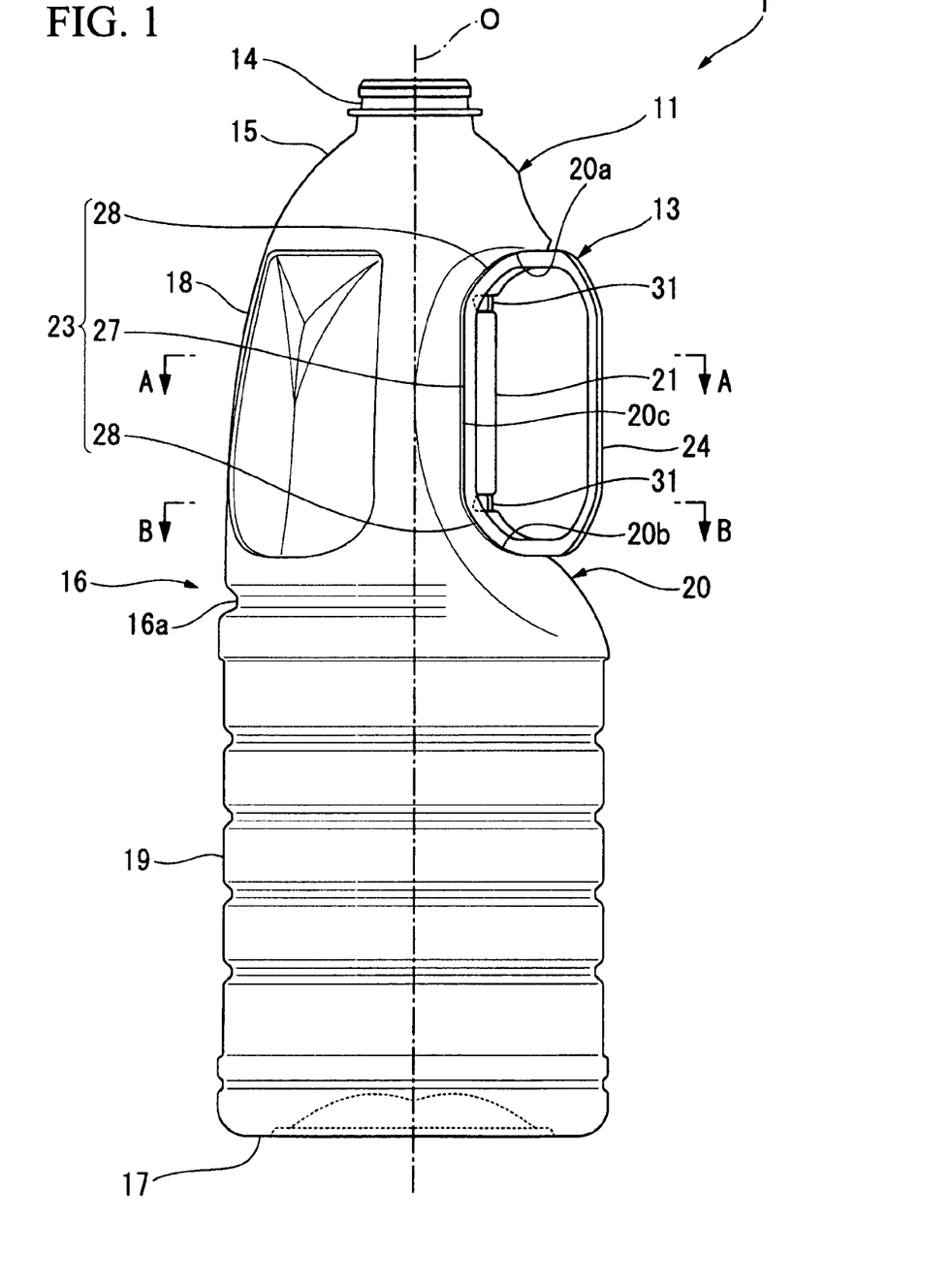
FIG. 1 is a side view of a bottle with a handle shown as an embodiment according to the present invention.

Herein, as shown in FIG. 1, the bottle 11 includes an opening portion 14, a shoulder portion 15, a body portion 16, and a bottom portion 17. The bottle 11 has a schematic configuration in which the opening portion 14, the shoulder portion 15, the body portion 16, and the bottom portion 17 are provided continuously in turn in the state of the respective central axes being positioned on a common axis.

Hereinafter, the common axis is called a bottle axis O. Furthermore, along the direction of the bottle axis O, the opening portion 14 side of the bottle is called an upper side, and the bottom portion 17 side of the bottle is called a lower side. Furthermore, a direction perpendicular to the direction of the bottle axis O is also called a radial direction, and a direction revolving around the direction of the bottle axis O is called a circumferential direction.

Furthermore, in the example shown in FIG. 1, the opening portion 14, the shoulder portion 15, the body portion 16, and the bottom portion 17 have the circular shapes when viewed from a transverse cross-section perpendicular to the bottle axis O.

The body portion 16 is formed with an annular concave rib 16a extends to in the circumferential direction in the center portion of the direction of the bottle axis O. With the annular concave rib 16a, the body portion 16 is comparted into an upper body portion 18 located above the annular concave rib 16a and a lower body portion 19 located under the annular concave rib 16a.

Furthermore, the body portion 16 is formed with a concave portion 20 that is recessed inward in the radial direction. In the example shown in FIG. 1, the concave portion 20 is formed such that the upper end portion thereof is located in the upper end portion of the upper body portion 18, and the lower end portion thereof is located in the lower end portion of the lower body portion 19. Moreover, the concave portion 20 is runs through the annular concave rib 16a in the direction of the bottle axis O and divides the annular concave rib 16a in the circumferential direction.

The concave portion 20 is defined by an upper surface 20a and a lower surface 20b and a bottom surface 20c. The upper surface 20a is located in the upper end portion and faces downward. The lower surface 20b is located in the lower end portion and faces upward. The bottom surface 20c connects the inner ends in the radial direction of the upper surface 20a and the lower surface 20b, and is extended along the direction of bottle axis O.

Figure 2:
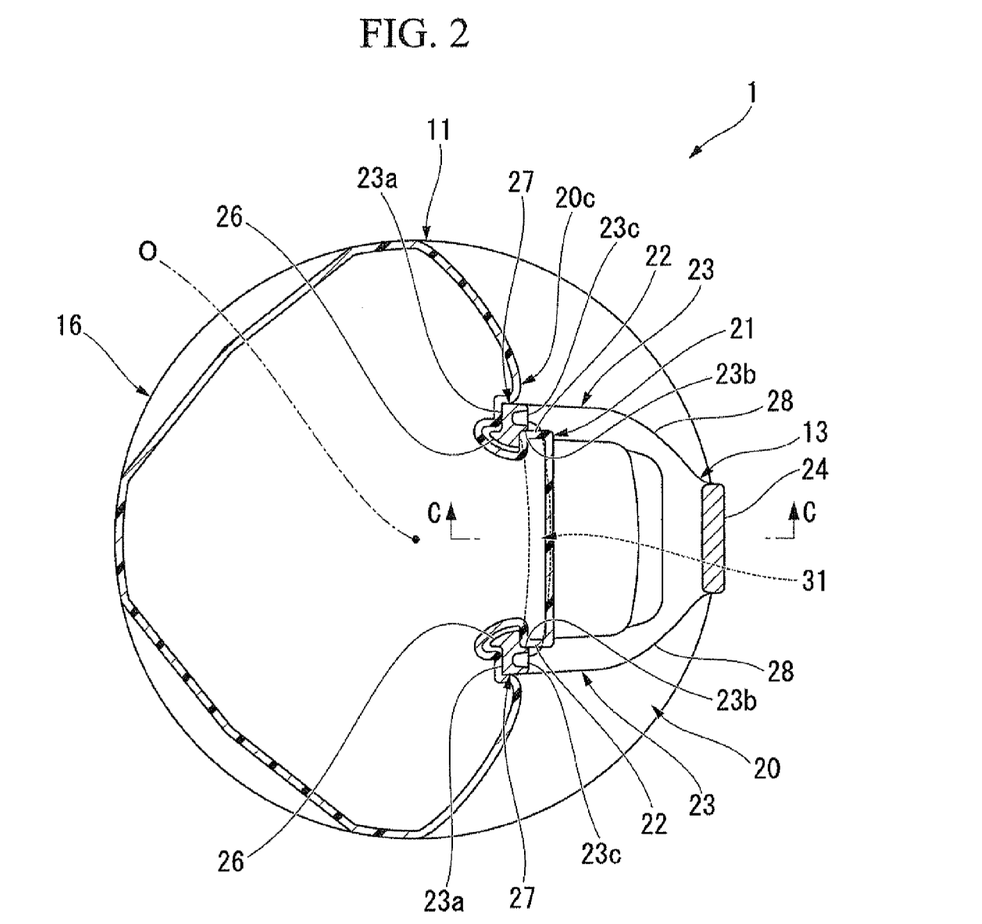
FIG. 2 is a cross-sectional view taken along an arrow A-A of the bottle with the handle shown in FIG. 1.
Figure 3:
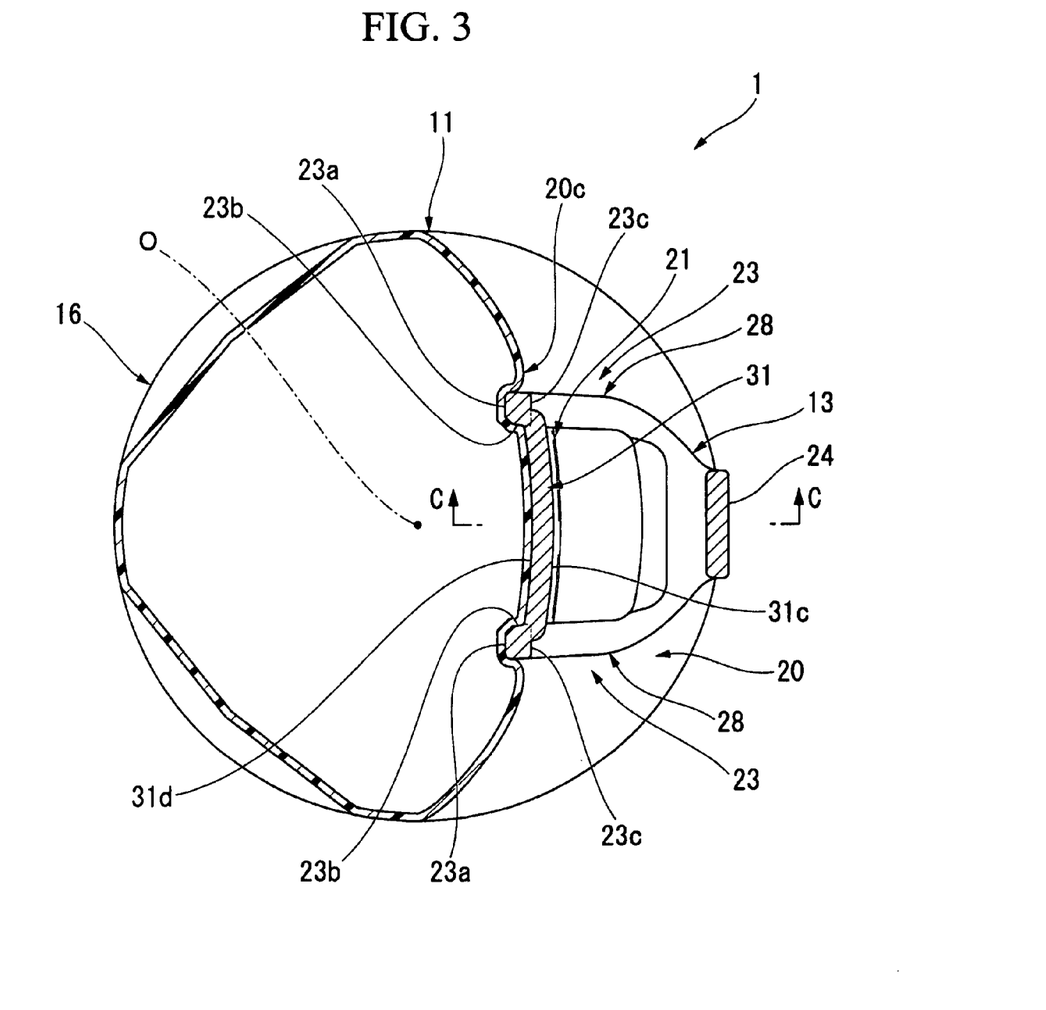
FIG. 3 is a cross-sectional view taken along an arrow B-B of the bottle with the handle shown in FIG. 1.
Figure 4:
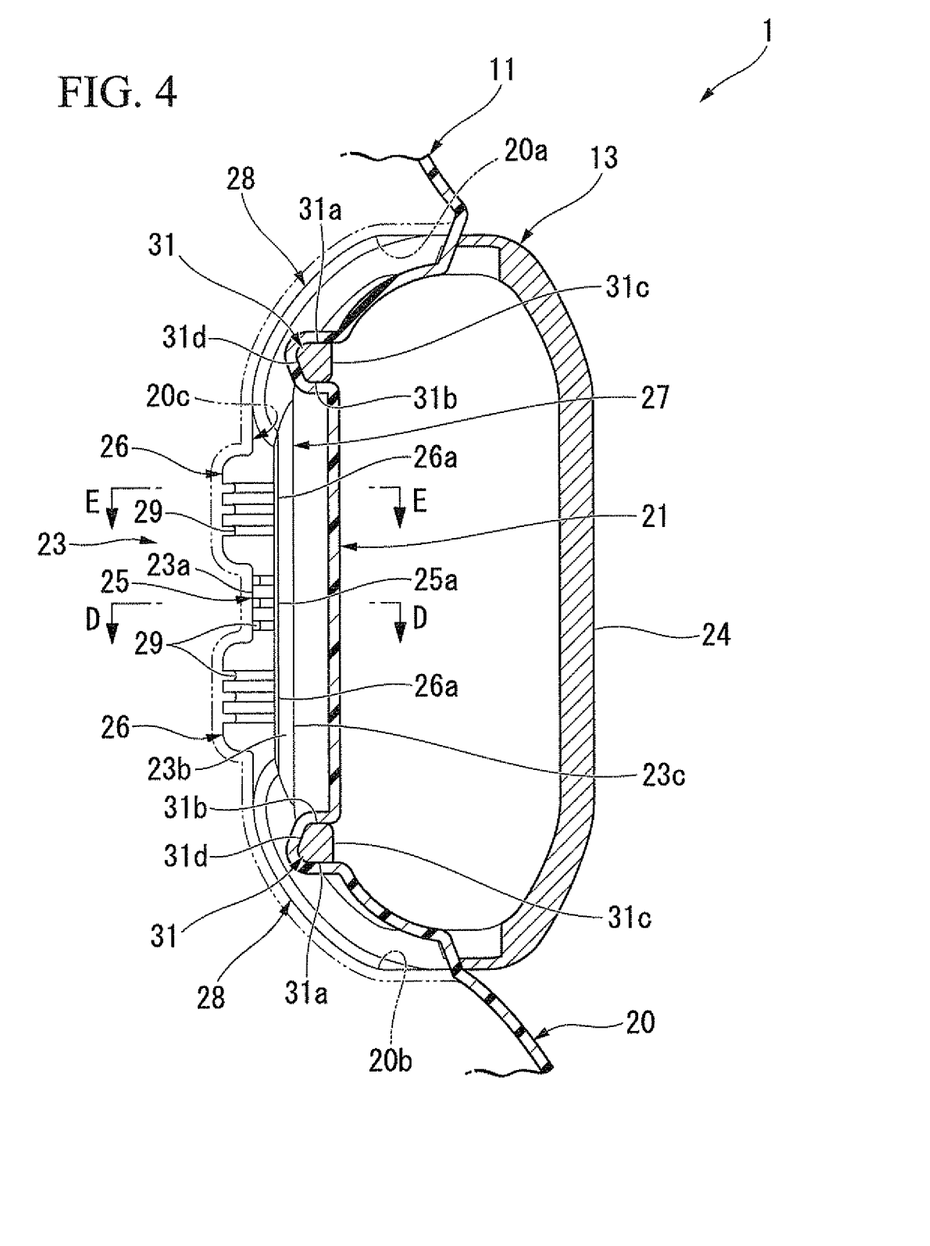
FIG. 4 is a cross-sectional view taken along an arrow C-C of the bottle with the handle shown in FIGS. 2 and 3.

A support projection portion 21 is provided in the bottom surface 20c so as to project from the bottom surface 20c toward the outside in the radial direction. The support projection portion 21 is formed in a flat rectangular parallelepiped shape. Furthermore, as shown in FIGS. 2 and 3, the support projection portion 21 is disposed in the center portion of the bottom surface 20e. Furthermore, as shown in FIGS. 1 and 4, the support projection portion 21 is extended along the direction of the bottle axis O. In addition, the support projection portion 21 is disposed over the entire length in the direction of the bottle axis O in the bottom surface 20c. In the examples shown in FIGS. 1 and 4, the support projection portion 21 is extended from the bottom surface 20c to the position reaching to the upper surface 20a and the lower surface 20b in the direction of the bottle axis O.

As shown in FIG. 2, both side portions of the support projection portion 21 have projection portions 22 projected to a side part with a gap between both side portions and the bottom surface 20c. The projection portions 22 are formed over the entire length of both side portions of the support projection portion 21 in the direction of the bottle axis O. The projection portions 22 are formed in the end portion of the support projection portion 21 projected from the concave portion 20.

As shown in FIGS. 2 to 4, the handle 13 includes a pair of mounting beams 23, a handle plate 24, and engagement projection pieces 25 and 26. The pair of mounting beams 23 has a contact surface 23a which comes into contact with each portion of the bottom surface 20c of the concave portion 20 in which both side portions of the support projection portion 21 are connected. The handle plate 24 is disposed outside the mounting beam 23 in the radial direction, and both ends in the direction of the bottle axis O are connected to both ends of the pair of mounting beams 23 in the direction of the bottle axis O. The engagement projection pieces 25 and 26 are projected from the pair of mounting beams 23 toward a direction in which the mounting beams 23 face each other, and are engaged with gaps that are provided between both side portions of the support projection portion and the bottom surface.

Figure 6:
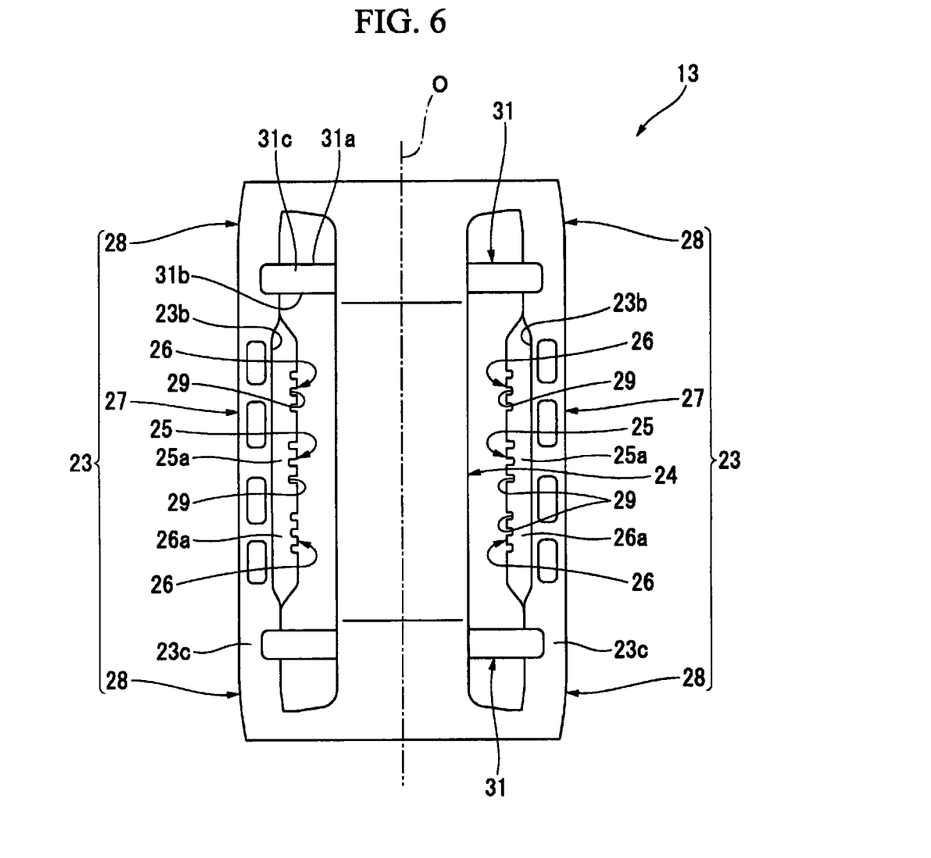
FIG. 6 is a plan view in which the handle shown in FIGS. 1 to 5B is viewed from the outside of a radial direction.
Figure 7:
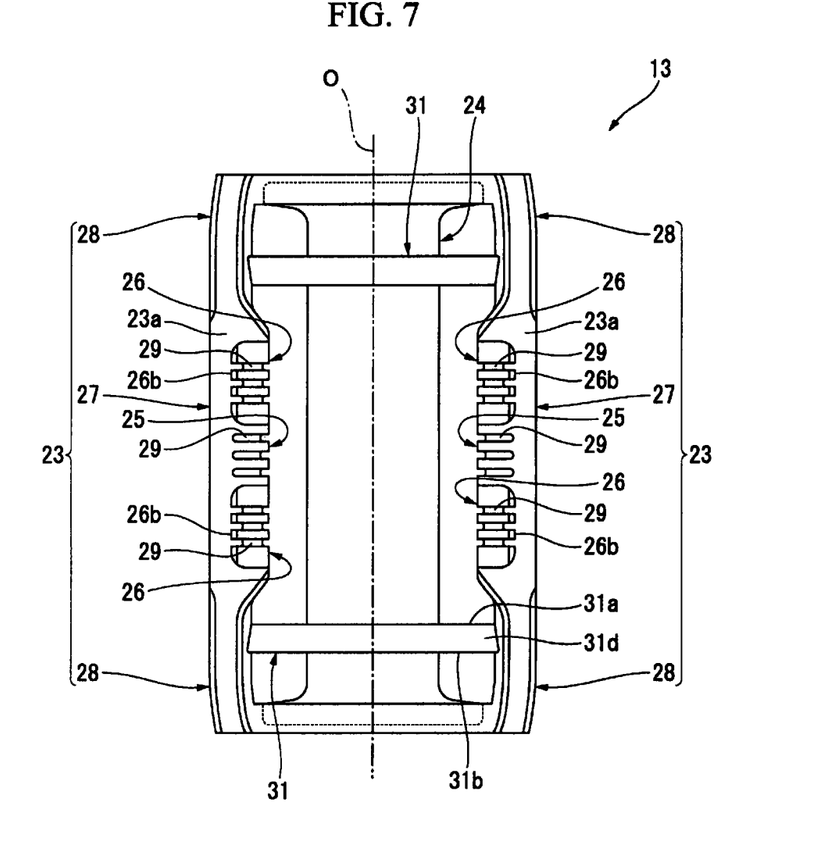
FIG. 7 is a plan view in which the handle shown in FIGS. 1 to 5B is viewed from the inside of a radial direction.

As shown in FIGS. 4, 6 and 7, the mounting beam 23 includes a straight line portion 27 extended in the direction of the bottle axis O and a connection portion 28 extended to the radial direction. The connection portion 28 is extended in the radial direction, and connects each of the upper end portions of the straight line portion 27 and the handle plate 24, and each of the lower end portions of the straight line portion 27 and the handle plate 24.

The engagement projection pieces 25 and 26 are disposed in the straight line portion 27. The engagement projection pieces 25 and 26 are disposed over the entire length in the straight line portion 27 in direction of the bottle axis O.

Figure 5A:
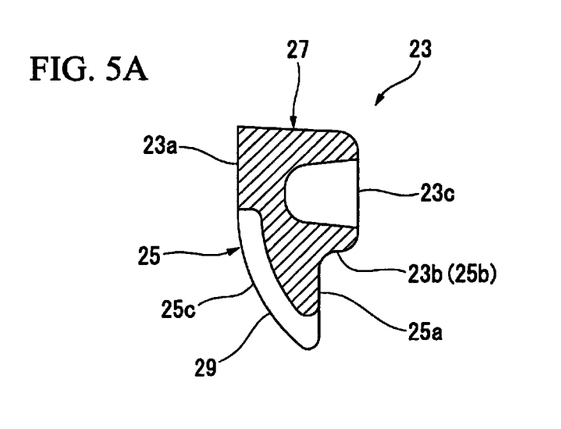
FIG. 5A is a cross-sectional view taken along an arrow D-D of the handle shown in FIG. 4.

In the engagement projection pieces 25 and 26, as shown in FIG. 5A, the first engagement projection piece 25 located in the center portion of the straight line portion 27 in the direction of the bottle axis O is configured so that the transverse cross section perpendicular to the bottle axis O is formed in the shape of a right triangle. Furthermore, among three surfaces forming the right triangle of the first engagement projection piece, a first surface 25a of the first engagement projection piece 25 is nearly vertically projected from the facing surface 23b by which the mounting beams 23 face each other in the pair of mounting beams 23. Furthermore, the facing surface 23b is part of a second surface 25b of the first engagement projection piece 25. A third surface 25c of the first engagement projection piece 25 is a sloped surface that connects the contact surface 23a with the projected end of the first surface 25a of the first engagement projection piece 25. In addition, the third surface 25c of the first engagement projection piece 25 is formed in a convex curved surface.

Figure 5B:
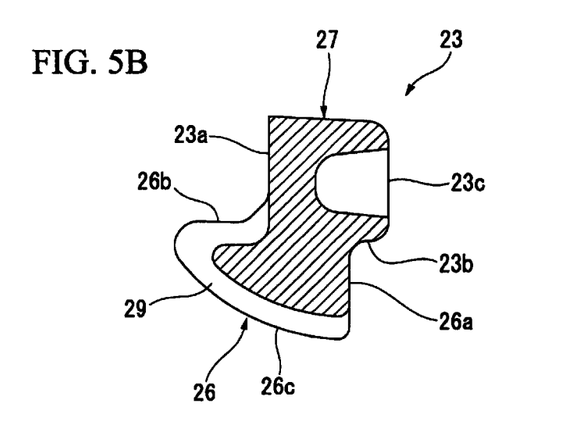
FIG. 5B is a cross-sectional view taken along an arrow E-E of the handle shown in FIG. 4.

In the engagement projection pieces 25 and 26, the second engagement projection pieces 26 are located on both sides interposing the first engagement projection piece 25 in the direction of the bottle axis O, that is, on both sides of the direction of the bottle axis O in the straight line portion 27. As shown in FIG. 5B, the second engagement projection pieces 26 are configured so that the transverse cross section perpendicular to the bottle axis O is formed in the shape of the right triangle. Among three surfaces forming the triangular shape of the second engagement projection piece 26, a first surface 26a of the second engagement projection piece 26 is nearly vertically projected from the facing surface 23b. A second surface 26b of the second engagement projection piece 26 is nearly vertically projected from the contact surface 23a. A third surface 26c of the second engagement projection piece 26 is a slope surface that connects the projected end of the first surface 26a of the second engagement projection piece 26 with the projected end of the second surface 26b of the second engagement projection piece 26. In addition, the third surface 26c of the second engagement projection piece 26 is formed on a convex curved surface.

Herein, as shown in FIG. 2, on the bottom surface 20c of the concave portion 20 of the bottle 11, a longitudinal engagement groove extended along the direction of the bottle axis O is formed at a portion in which the second engagement projection piece 26 is located, in the portion facing the projection portion 22. A portion projected inward in the radial direction from the contact surface 23a of the second engagement projection piece 26 is engaged with the longitudinal engagement groove.

On the third surface 25c of the first engagement projection piece 25, a plurality of transverse microgrooves 29 is formed at intervals in the direction of the bottle axis O. On the second surface 26b and the third surface 26c of the second engagement projection piece 26, a plurality of transverse microgrooves 29 is formed at intervals in the direction of the bottle axis O. Furthermore, as shown in FIGS. 4 and 6, the first surfaces 25a of the first engagement projection piece 25 and the first surfaces 26a of the second engagement projection piece 26 are smoothly connected without a step in the direction of the bottle axis O.

Herein, the center portions of the straight line portion 27 and the handle plate 24 in the direction of the bottle axis O coincide with each other. Furthermore, the straight line portion 27 has a length in the direction of the bottle axis O shorter than that of the handle plate 24.

Moreover, from the inside to the outside in the radial direction, that is, a side of the straight line portion 27 toward a side of the handle plate 24, the connection portion 28 is gradually extended, from the inside to the outside of the handle 13 in the direction of the bottle axis O, and connects the upper ends of the straight line portion 27 and the handle plate 24 and connects the lower ends of them. Furthermore, the connection portion 28 is formed in the shape of the curved surface of the protrusion toward the outside of the handle 13 along the direction of the bottle axis O.

Furthermore, the handle plate 24 is constituted by a rectangular plate body longer in the direction of the bottle axis O, and four corners thereof are connected to the straight line portion 27 via the four connection portions 28.

Moreover, in the present embodiment, the pair of mounting beams 23 are integrally provided with a bridged beam 31 which connects each other in the opposite direction, in the state of being spaced from the handle plate 24 to the inside in the radial direction.

As shown in FIGS. 2 and 3, the bridged beam 31 is slightly curved so as to be projected toward the outside in the radial direction. The bridged beam 31 is integrally connected with the back surface 23c of the opposite side of the contact surface 23a and the facing surface 23b, in the surface of the mounting beam 23. The bridged beam 31 overhangs from the back surface 23c of the mounting beam 23 to the outside in the radial direction. Furthermore, the bridged beam 31 is located outside the contact surface 23a in the radial direction.

A plurality of bridged beams 31 is disposed at intervals in the direction of the bottle axis O. In the example shown in FIG. 6, a pair of bridged beams 31 is disposed so as to be symmetrical based on the center portion of the direction of the bottle axis O in the mounting beam 23.

Furthermore, in the present embodiment, as shown in FIG. 4, the bridged beam 31 is disposed in the end portion of the connection portion 28 at the side of the straight-line portion 27.

The bridged beam 31 is configured so that the shape of the bridged beam 31 is formed in a substantially rectangular shape when viewed from the cross section in the direction of the bottle axis O. The bridged beam 31 is configured so that, among four surfaces 31a, 31b, 31c and 31d forming the substantially rectangular shape, two surfaces 31a and 31b face the direction of the bottle axis O (that is, a surface substantially perpendicular to the direction of the bottle axis O) and the remaining two surfaces 31c and 31d face in the radial direction (that is, the surface 31e is substantially perpendicular to the radial direction and the surface 31d is inclined to the radial direction).

The bridged beam 31 is buried in the support projection portion 21 in the state of exposing the radial outside surface 31c facing the outside of the radial direction, among the surfaces 31a to 31d thereof. As shown in FIG. 4, among the surfaces 31a to 31d of the bridged beam 31, from the inside to the outside of the radial direction, the radial inner side surface 31d facing the inside of the radial direction is gradually inclined, from the connection portion 28 to the straight line portion 27 in the direction of the bottle axis O.

Furthermore, among the surfaces 31a to 31d of the bridged beam 31, the axial outer side surface 31a faces the outside of the handle 13 in the direction of the bottle axis O, and the axial inner side surface 31b faces the inside of the handle 13 in the direction of the bottle axis O. Moreover, among the surfaces 31a to 31d of the bridged beam 31, the coupling portion between the axial outer side surface 31a and the axial inner side surface 31b and the radial inner side surface 31d, and the coupling portion between the radial outer side surface 31c and the axial inner side surface 31b are formed in the shape of the curved surface of the projection. In addition, the curvature radius of the coupling portion between the radial inner side surface 31d, and the axial outer side surface 31a and the axial inner side surfaces 31b is greater than the curvature radius of the coupling portion between the radial outer side surface 31c and the axial inner side surface 31b.

In addition, the curvature radius of the coupling portion between the radial inner side surface 31d, and the axial outer side surface 31a and the axial inner side surface 31b may be less than or equal to the curvature radius of the coupling portion between the radial outer side surface 31c and the axial inner side surface 31b. Furthermore, the curvature radius of the coupling portion between the radial inner side surface 31d and the axial outer side surface 31a may be different from the curvature radius of the coupling portion between the radial inner side surface 31d and the axial inner side surface 31b.

As described above, according to the bottle with handle 1 according to the present embodiment, since the bridged beam 31 is disposed, it is possible to suppress the pair of mounting beams 23 being displaced in an expanding direction so as to be separated from each other. As a result, it is possible to prevent the engagement projection pieces 25 and 26 deviating from the handle 13 from being shifted or deviating the bottle 11 due to the gap.

Furthermore, since the bridged beam 31 is separated from the handle plate 24 to the inside of the radial direction, it is possible to prevent the handle plate 24 from being difficult to grip due to the disposition of the bridged beam 31.

In addition, since the bridged beam 31 is integrally provided in the mounting beam 23, it is possible to prevent an increase in the number of the components. Furthermore, it is possible to reliably prevent the pair of mounting beams 23 from being displaced in expanding direction so as to be separating from each other as mentioned above.

Furthermore, the bridged beam 31 is disposed on the connection portion 28 rather than the straight line portion 27 in the mounting beam 23. For that reason, it is possible to prevent the disposition positions of the engagement projection pieces 25 and 26 being limited by the disposition of the bridged beam 31, whereby it is possible to prevent the attachment strength of the handle 13 to the bottle 11 being lowered, due to the disposition of the bridged beam 31.

In addition, the bridged beam 31 is disposed on the end portion of the connection portion 28 at a side of the straight line portion 27 rather than the portion near the handle plate 24. Thus, it is possible to more reliably prevent the pair of mounting beams 31 from being displaced in the direction of spreading so as to be separated from each other as mentioned above.

In addition, the technical scope of the present invention is not limited to one embodiment, but various modifications can be made within the scope not departing from the spirit of the present invention.

For example, in the one embodiment mentioned above, a plurality of bridged beams 31 is disposed, but the bridged beam 31 may be one. Furthermore, the bridged beam 31 may be curved so as to be projected toward the inside of the radial direction, and may be extended in the shape of the straight line. In addition, the bridged beam 31 may be connected to any surface of the mounting beam 23. Furthermore, the bridged beam 31 may be disposed on any portion of the mounting beam 23. Additionally, the shape in the cross section orthogonal to the direction of the bottle axis O of the bridged beam 31 may be suitably changed without being limited to the embodiment mentioned above.

Furthermore, the engagement projection pieces 25 and 26 may be the same form over the entire length of the direction of the bottle axis O in the straight line portion 27.

Furthermore, in the embodiment mentioned above, the respective shapes when viewed from the transverse cross section perpendicular to the bottle axis O of the opening portion 14, the shoulder portion 15, the body portion 16 and the bottom portion 17 are the circular shapes. However, for example, the shapes may be suitably changed such as polygonal shapes without being limited thereto.

Furthermore, the synthetic resin material forming the bottle 11 and the handle 13 may be suitably changed such as, for example, polyethylene terephthalate, polyethylene naphthalate, amorphous polyester or the like, or a blend material thereof.

In addition, the bottle 11 may be a laminated structure having an intermediate layer without being limited to a single layer structure. As the intermediate layer, for example, a layer formed of a resin material having a gas barrier, a layer formed of a recycled material, a layer formed of a resin material having oxygen absorption property or the like may be adopted.

The components in the embodiment mentioned above can be suitably replaced with known components within the scope not departing from the spilit of the present invention, and the modified examples mentioned above may be suitably combined with each other.

The invention is not to be considered as being limited by the foregoing description, and is only limited by the scope of the appended claims.

What is claimed is:

1. A bottle with a handle, comprising:
a body portion is formed with a concave portion recessed inward in a radial direction of the bottle;
a support projection portion projected outward in the radial direction on a bottom surface of the concave portion;
protrusion portions being protruded from both side portions of the support projection portion with a gap between the bottom surface; and
a handle being attached to the body portion; wherein
the handle comprises:
a pair of mounting beams having contact surfaces coming into contact with each portion extended to both side portions of the support projection portion on the bottom surface of the concave portion;
a handle plate being disposed outside the mounting beams in the radial direction and in which both ends of a bottle axial direction are separately connected to both ends of the bottle axial direction of the pair of mounting beams; and
an engagement projection piece being provided on the pair of mounting beams, the engagement projection piece projecting in an opposite direction to that in which the protrusion portions protrude, and being engaged with the gap, and
wherein a bridged beam, configured to connect each of the mounting beams, is integrally formed with the pair of the mounting beams, and the bridged beam is buried in the support projection portion in the state of exposing a radial outside surface of the bridged beam facing the outside of the radial direction.

2. The bottle with the handle according to claim 1, wherein the mounting beam includes a straight line portion which is extended in the bottle axial direction, and a connection portion which is extended in the radial direction and connects upper ends of the straight line portion and upper end of the handle plate and lower ends thereof, and
the engagement projection piece is disposed in the straight line portion, and the bridged beam is disposed in the end portion of the connection portion at the straight line portion side.

* * * * *